United States Patent [19]

Fraser et al.

[11] Patent Number: 4,611,744
[45] Date of Patent: Sep. 16, 1986

[54] TURBINE BLADE REPAIR

[75] Inventors: Michael J. Fraser, Birmingham; Raymond D. Legros, Lower Wick, both of United Kingdom

[73] Assignee: Refurbished Turbine Components Ltd., Worcester, England

[21] Appl. No.: 505,775

[22] Filed: Jun. 20, 1983

[30] Foreign Application Priority Data

Jun. 23, 1982 [GB] United Kingdom ................. 8218214
Mar. 15, 1983 [GB] United Kingdom ................. 83-7164

[51] Int. Cl.⁴ ............................................. B23P 15/02
[52] U.S. Cl. ................................ 228/119; 29/156.8 B; 29/402.18; 228/231; 228/232
[58] Field of Search ...................... 228/119, 231, 232; 29/156.8 B

[56] References Cited

U.S. PATENT DOCUMENTS

| | | | |
|---|---|---|---|
| 2,454,580 | 11/1948 | Thielemann | 228/232 X |
| 3,045,098 | 7/1962 | Norton | 219/19 |
| 3,246,392 | 4/1966 | Altgelt | 29/402 |
| 3,535,768 | 10/1970 | Pruitt et al. | 228/232 |
| 3,574,924 | 4/1971 | Dibble | 228/119 |
| 3,660,882 | 5/1972 | Widowitz et al. | 29/156.8 B |
| 4,141,127 | 2/1979 | Cretella et al. | 228/119 X |
| 4,176,433 | 12/1979 | Lee et al. | 228/119 X |
| 4,498,617 | 2/1985 | Guertin et al. | 228/119 |

FOREIGN PATENT DOCUMENTS

| | | |
|---|---|---|
| 163091 | 12/1981 | Japan ........................... 228/119 |
| 823111 | 11/1959 | United Kingdom . |
| 1253187 | 11/1971 | United Kingdom . |
| 1591143 | 6/1981 | United Kingdom . |
| 1501143 | 6/1981 | United Kingdom . |

OTHER PUBLICATIONS

Baker, "Molten Metal Flood–the Basis for Large-Scale Repairs", *Welding and Metal Fabrication*, Jun. 1981, pp. 257–260.

P. T. Houldcroft—"Welding Process Technology", 1977—Line 18, p. 257 and Paragraph 3, p. 296.

D. Romans & E. N. Simons, "Welding Process & Technology ", Lines 1-5, p. 217′, p. 235, pp. 7-11, p. 248.

*Primary Examiner*—Kenneth J. Ramsey
*Attorney, Agent, or Firm*—Parmelee, Miller, Welsh & Kratz

[57] ABSTRACT

A method of repairing turbine blades including a repair step which involves the application of substantial thermal energy to the blade such as a welding or brazing operation includes a pre-heating step in which the blade is heated to a predetermined temperature in a controlled manner. The controlled heating may be continued both during the repair step involving the application of substantial thermal energy and after the repair step in order to minimize stress in the blade due to the application of considerable thermal energy to the blade.

12 Claims, 16 Drawing Figures

FIG 1ª

TURBINE BLADE REPAIR

BACKGROUND OF THE INVENTION

Field of the Invention

The present invention relates to a method of repairing turbine blades.

In use, turbine blades are subject to both erosion damage and cracking due to high stress in the blade.

The tip of a turbine blade in a rotor assembly is the part of the blade which experiences maximum velocity and is hence the part subject to the greatest erosion.

The present invention relates primarily but not exclusively to blades used in steam turbines. Erosion or damage of steam turbine blades generally occurs following contact between the turbine blades and either particles carried by the steam or water droplets.

Damage can occur from metal or other solid particles, for example boiler scale, entering a steam turbine with the steam flow and striking the blades. Water droplet damage is generally restricted to the final stages of a turbine. However all stages of a turbine can be affected by particle damage.

The rate of erosion of turbine blades will be dependent upon the relative speeds between the blades and the particles or water droplets causing the erosion and it is generally the leading edge at the outer end of each blade that is most prone to erosion by impact.

At the low pressure end of a steam turbine the steam is at a lower temperature having been cooled during passage through the turbine and at the dew point water droplets precipitate giving rise to "wetter" steam. The transfer of energy by impact in the turbine blades of the steam is therefore greater at the lower pressure end than at the high pressure end of the turbine. Once again it is predominantly the outer ends of the blades which are especially subject to erosion.

To reduce the rate of erosion, it is usual to provide a shield at the leading edge of the outer end of the turbine blade, such a shield being made from a material harder than the blade material.

Steam turbine blades may be made from many suitable materials, a typical example being a 13% chrome steel and the shield may be made from stellite or a suitably hardened steel. The shield may be brazed or welded to the blade.

After a period of use it is often found that the shield has been considerably eroded and one accepted method of repair is to first remove the old shield and secure a new shield in place either by brazing the new shield to the blade or building up a new shield by applying fused metal in a welding operation. The blade is then machined in the area of the repair to return it to its original aerofoil profile.

Cracks in turbine blades due to stress in the blade usually occur at stress concentrations and notches found near discontinuities in the blade aerofoil or root section.

Turbine rotors generally speaking have two types of blades:

(a) Free-standing, secured to the rotor only at the root but which have no connection between adjacent blades;

(b) "Tied" blades which are additionally connected to each other by cover bonds connecting each blade by tenons at the end of the blade secured to a shroud passing round the ends of all the blades, or "lacing wires" which pass through holes in the blades, each blade being brazed or otherwise secured to the lacing wires. Some turbine blades are provided with snubbers, snubbers being projections from the lower and upper surfaces of the blade to connect with similar projections from the upper and lower surfaces of adjacent blades.

Repair of the two types of turbine blades involving welding or brazing steps leads to deformation of the blades. In the case of free-standing blades the blade is allowed to deform during the application of heat from the welding or brazing stage and thereafter may be mechanically returned to its original shape i.e. by bending. With blades which are tied to each other by lacing wire, snubbers, etc., the application of substantial thermal energy to the blade during a welding or brazing operation does not deform the blade to such an extent since unrestricted movement of the blade is not permitted due to the presence of the lacing wires, etc. Since the blade is not able to freely move considerable stress is imparted to the blade the problems associated with such stress not being apparent until operation of the turbine when cracks may appear in the stressed areas.

It has also been found that even with blades that are free-standing the mechanical force needed to return the blade to its original form itself imparts stress to various areas of the blade which can lead to premature failure of the blade.

The problem of premature cracking of the blade after repair occurs with both types of blades mentioned above and is associated with any type of repair to the blade in which substantial thermal energy is applied to the blade normally during a welding or brazing operation.

It has, for various reasons, not been found possible to carry out satisfactory repairs to rectify, for example, cracks more than a few millimeters long since in practice such repairs have to be carried out by welding, and pollution of the weld material cannot be completely avoided. More significantly the stress in the blade resulting from the welding process is such that distortion and/or residual stress can lead to "stress corrosion cracking" leading in turn to premature failure of the blade and hence the failure of the turbine during operation.

It has been proposed in an earlier application by the applicants to ameliorate these problems by subjecting the turbine blade after repair to a controlled heat treatment process to relieve stress in the blade caused by high temperature gradients generated during the repair process.

Such a method of repair enables a more satisfactory repair and increases the usable life of the blade after repair.

SUMMARY OF THE INVENTION

It is an object of the present invention to provide a new or improved method of repairing turbine blades.

According to the present invention we provide a method of repairing a turbine blade, said method comprising the steps of:

(a) applying heating means to selected areas of a turbine blade to be repaired;

(b) heating said areas of the turbine blade to desired temperatures;

(c) carrying out a repair step on said blade, said repair step involving the application of substantial thermal energy to the blade;

(d) controlling said heating means during said repair step so as to heat said selected areas in a manner to reduce forces acting upon the blade due to the occurrence of thermal expansion in the blade resulting from application of said substantial thermal energy;

(e) controlling said heating means after said repair step so as to maintain said turbine blade at a predetermined temperature for a predetermined length of time.

The method of the present invention involving controlled heating of the turbine blade prior to the application of said thermal energy and enables the problem of residual stress after repair to be reduced by increasing the temperature of the blade in the area of the repair prior to the application of said thermal energy, thereby significantly decreasing temperature gradients in the blade, high temperature gradients which occur during the application of said substantial thermal energy are believed to cause high residual stress in the blade.

Preferably, the controlled heating of the turbine blade is maintained during application of said thermal energy and it is envisaged that the controlled heating may continue after application of said thermal energy.

Preferably the area of the turbine blade immediately surrounding the part to be repaired, and to which said thermal energy is to be applied is first heated to a temperature greater than areas of the turbine blade further removed from said part.

It is a further object of the present invention to provide a new or improved method of repairing turbine blades which reduces the stress imparted to a blade following the application of said thermal energy thereto.

According to a further aspect of the invention we provide a method of repairing a turbine blade which repair involves the application of substantial thermal energy to the turbine blade wherein, prior to the application of said thermal energy to the blade said turbine blade is heated in a controlled manner the sources of heat being positioned so that the areas of the blade which are heated in a controlled manner tend to cause distortion of the blade in a direction exactly opposite to the distortion likely to be caused by the application of said thermal energy during repair of the blade.

The above described method of repair is of particular relevance both to the repair of free-standing turbine blades and those blades tied by snubbers brazing wires etc., since by the application of controlled heat prior to a repair operation involving the application of said thermal energy, the distortion of a blade which would have occurred, had no controlled heating taken place, is mimimised.

It is further envisaged that controlled heat may be applied to the blade in selected areas during the application of said thermal energy to reduce the forces acting upon the blade due to thermal expansion occurring in the blade following the application of said thermal energy.

Preferably a greater heat source is applied on the side of the blade opposite to the side of the blade which, during the repair process, is likely to reach the highest temperature.

The ability to be able to heat different parts of the turbine blade to different temperatures enables the provision of a temperature differential between different parts of the turbine blade to both counter expected distortion during the application of said thermal energy and also to minimise stress by heating the blade to a temperature nearer to the temperature to which the part of the blade to be repaired is likely to attain during application of said thermal energy. Such a provision may enable a repair to be carried out to a turbine blade in situ i.e. on a rotor or stator since, in many case, it wil not be necessary to remove the blade for subsequent heat treatment in ovens and/or treatment by mechanical forces to return the blade to its original form.

The method of repair of the present invention has been found to be particularly suitable for many repairs requiring a welding or brazing step such as welding cracks in a blade and re-building hard metal shields at the outer end of the leading edge of a turbine blade. In many cases such repairs may be carried out without removal of the blade from its rotor or its stator as the case may be.

It is thus another object of the present invention to provide a new or improved method of repairing turbine blades.

According to another aspect of the present invention we provide a method of repairing a crack in a turbine blade, said method involving the application of substantial thermal energy, said method comprising the steps of:

1. removing material from the turbine blade in the area of the crack or other defect,
2. heating the turbine blade in a controlled manner to a predetermined desired temperature,
3. replacing the removed material with metal in a fused state by a welding or brazing process,
4. subsequently applying heat to the turbine blade and maintaining the turbine blade at a temperature, or a series of different temperatures, for a predetermined length of time such as to eliminate, or substantially reduce, stress present in said blade due to said welding process.

Preferably said turbine blade is maintained at said first predetermined temperature during the welding process.

Conveniently electrical heating means are provided to heat the turbine blade to the required temperature before welding takes place, during the welding process and also after the welding process to provide heat for heat treatment.

Control of the temperature of the turbine blade by the use of electrical heating means enables satisfactory and accurate control of the desired temperatures to be achieved.

When it is required to repair a turbine blade in situ it is often the case that the turbine blade is accessible only from one side thereof with respect to the welding apparatus and, preferably therefore sufficient material is removed from the damaged blade in the region of the crack to enable a satisfactory weld to be carried out only from that one side of the blade.

Preferably a significant amount of material is removed from the region surrounding the innermost end of the crack and the welding process is commenced at that end, the enlarged hole or recess thus formed in the blade enhancing the bond between the weld material and the parent material of the blade.

Conveniently the welding process is commenced at the innermost end of the crack since the temperature of the material of the blade will be lower at the beginning of the welding process than at the end of the welding process due to the heat generated during the process itself and, since the risk of migrating impurities during welding and oxidation is increased as the temperature increases, it is undesirable to have a region where impurities may be concentrated in a central region of the turbine blade.

Preferably, prior to commencement of the welding process as aforementioned, material is removed from the blade in the region of the crack to form a slot in the blade, which slot is preferably tapered so that the width of the slot increases in a direction towards the edge of the blade from which the crack extends.

Filling of the slot during the welding process by weld metal commencing from the inner end of the slot will then tend, as the weld metal solidifies, to close the slot, the formation of the tapered slot permitting of said closing while maintaining a sufficient gap to enable weld material to be positioned therewith, which weld material extends from one side of the blade to the other and bonds satisfactorily with the parent metal of the blade.

The permitting of movement of the blade during the welding process assists in minimising the occurence of stress in the turbine blade.

The usual cause of cracks occurring in turbine blades is due to stress resulting from the high temperatures and pressures and to cyclic stress reversals to which turbine blades are subjected during operation. As the blade age hardens it may become more susceptible to cracks due to its reduced ductility and it can no longer satisfactorily deal with the strains to which it is subjected.

If, therefore, the crack is repaired it may be that, even though a satisfactory repair has been made, after further use another crack may appear in another part of the parent material of the blade.

It is a further object of the present invention to provide a method of repairing turbine blades which enhances the term of future life of the blade.

According to another aspect of the present invention we provide a method of repairing a crack in a turbine blade, said method involving the application of substantial thermal energy and comprising the steps of
1. removing malerial from the blade in the region of the crack,
2. heating the blade to a first predetermined temperature,
3. carrying out a welding process on the blade to replace said removed material by fused metal,
4. subsequently increasing the temperature of said blade to a second predetermined temperature for a predetermined length of time to relieve stress in said blade,
5. the material of the weld metal being different from that of the parent material of the blade and being endowed with considerably more inherent resilience than the parent material of the blade.

By the use of material of greater resilience than that of the parent material of the blade, a considerable advantage is gained since in future use of the blade the new material can be deformed resiliently to cope with changes of dimension of the blade due to the application of pressure and temperature, thereby reducing by a considerable amount the stress in the blade and so enhancing the length of its working life.

To ensure minimum migration of impurities into the weld metal during the welding process, it is desirable that the welding is carried out in an inert atmosphere and conveniently, where the weld is carried out from one side of the blade only and the inert gas is applied from the same side, backing means may be provided on the other side of the blade so as to provide a barrier to the inert gas and hence substantially surround the welding area with inert gas.

Such a backing member is known as chill.

Conveniently, in order to ensure the whole weld area is surrounded by inert gas, further means may be provided to introduce said inert gas on both sides of the blades and conveniently said chill may be provided with a source of supply of inert gas and passages through the chill to directing gas to said welding area.

Conveniently the method of repair of the present invention provides for automatic control of the heating means for carrying out the controlled heating and it is possible, once optimum values have been obtained by analysis of test repairs, to ensure that the controlled heating means applies the optimum amount of heat to different parts of the turbine blade in order to minimise the occurrence of stress.

Since ambient conditions may differ, the invention further provides that heat sensing means may be provided providing one or more input signals to control means to control the amount of heat supplied to the heating means and/or change the amount of heat supplied by the heating means from pre-arranged values.

Preferably said heating means may be energised by electricity and may comprise electrically conducting elements at least partly surrounded by ceramic beads through which the heat is radiated and conducted to the turbine blade.

According to another aspect of the invention we provide a method of repairing a plurality of substantially similar or identical turbine blades comprising the steps of
(a) preheating at least part of one turbine blade under controlled conditions,
(b) repairing said blade involving the application of said thermal energy,
(c) analysing the structure of the repaired blade,
(d) repeating steps (a) to (c) at least once on the same or another turbine blade,
repairing the other or each similar turbine blade, such repair comprising the steps of
(e) preheating at least the part of the or each of said other turbine blade to which repairs are to be carried out,
(f) controlling the heating of the or each said turbine blade to obtain the most satisfactory results obtained from said analysis,
(g) repairing the turbine blade incorporating a step involving the application of said thermal energy.

Where it is required to repair turbine blades in situ, that is turbine blades connected in an array on a rotor or stator, and in particular where such turbine blades are "tied" at their outer ends by means of a shroud or the like that in addition to pre-heating the turbine blade to be repaired the adjacent blades on either side of the turbine blade to be repaired may also be heated.

Blades adjacent to the blade to be repaired may be heated to a temperature lower than that to which the blade to be required is heated in order to minimise forces acting between the blades and the shroud due to thermal expansion of the blade to be repaired.

The blade to be repaired may be heated only on one side in order to predistort the blade to compensate for distortion occurring during application of considerable thermal energy. The blades on either side of the blade to be repaired may be heated more generally and in a manner which does not cause distortion of such blades in order that mechanical forces due to thermal expansion between the connection between the blades and the shroud and tennons is more evenly spread over a number of blades rather than being concentrated on a single or a small number of blades.

Preferably in the repair of turbine blades in situ, which turbine blades are interconnected with each other by means of snubbers, lacing wires and in particular shrouds, the pre-heating of the turbine blade to be repaired may be localised to the site where considerable thermal energy is to be applied during a welding process in order to minimise thermal expansion of the blade.

It is envisaged that one, two or more turbine blades either side of the blade to be repaired may be heated to a temperature decreasing as the distance away from the repaired blade increases.

It is envisaged that, not only may the heating means continue to apply heat during the repair of the turbine blade, but also the temperature of the turbine blade surrounding the area to be repaired may be monitored to alter the amount of heat applied by the heating means. Such a provision enables the heat applied to the turbine blade to be increased should the repair step involving the application of said thermal energy take longer than planned, thus raising that area of turbine blade above an expected temperature. Similarly, should the repair step involving the application of said thermal energy be carried out faster than is planned, then the heating means may have the energy applied thereto reduced should such a reduction in temperature be desirable.

It is further envisaged that the means for monitoring distortion or other changes in the blade both during test analysis and during a repair may also be provided such means for example comprising strain gauges in order that bending of the blade during the repair step requiring said thermal energy may be monitored and controlled heat applied to the blade at different areas to provide on opposite bending force to minimise distortion of the blade.

It is further envisaged that monitoring means such as strain gauges and thermocouples may feed signals to control means to automatically control the heating means to control the temperature of different parts of the blade. The control means may also have output signals indicating that a turbine blade is at a suitable temperature for a repair step involving the application of said thermal energy to be carried out, and then monitor the repair step to decrease or increase the temperature of the heating means and also to indicate if the repair step should cease until conditions in the blade have changed.

BRIEF DESCRIPTION OF THE DRAWINGS

The invention will now be described in more detail by way of example only with reference to the accompanying drawings wherein:

FIG. 1A is a perspective view of a complete turbine wheel of blades;

Three turbine blades are shown at 10, 11 and 12, each turbine blade having throughbores 13 and 14 through which pass respectively lacing wire 15 and 16.

The lacing wires 15 and 16 can pass either with clearance through the respective throughbores 13 or 14 of the turbine blades or may be joined thereto by welding for example. The purpose of the lacing wires 15 and 16 is to prevent excessive relative movement between the blades and to generally inhibit certain modes of vibration during operation of the turbine.

Figure 1:
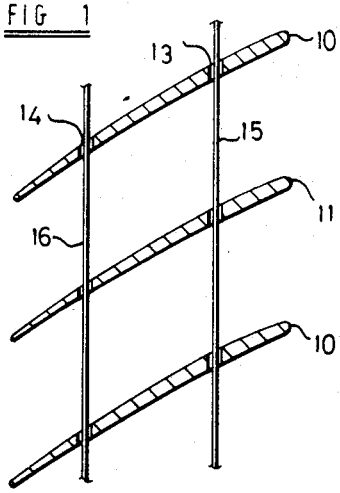
FIG. 1 is a cross-sectional view looking radially inward on three turbine blades interconnected by lacing wires.

FIG. 1A illustrates an example of a rotor from a turbine, the three turbine blades 10, 11 and 12 shown in FIG. 1 being three of a considerable number of blades forming the complete array in the rotor.

The turbine blades, such as those shown at 10, 11 and 12, can be made from a variety of materials depending on the function and operating conditions of the turbine. A typical material from which a blade in a steam turbine may be manufactured is chrome steel with approximately 13% chromium.

Figure 2:
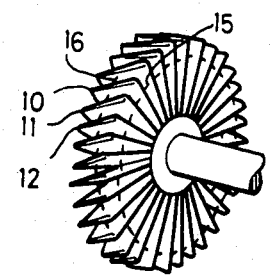
FIG. 2 is a view of an end region of a turbine blade illustrating the area where erosion is most common.
Figure 2:
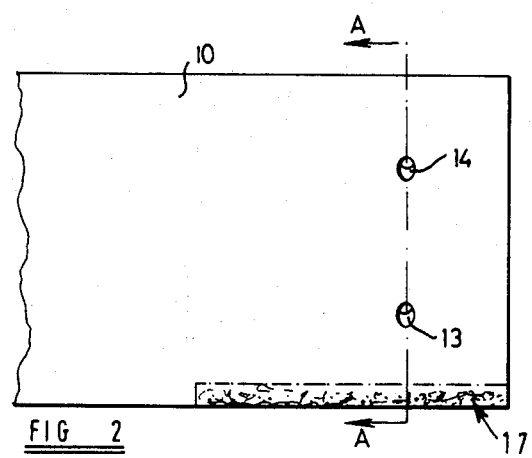

Referring now to FIG. 2, the area of the turbine blade most prone to erosion is illustrated, this being the leading edge 17 of the outer end of the turbine blade. For the reasons aforementioned it is this part of the blade which collides with the steam or particles carried thereby during use of the turbine, and which also has the greatest peripheral velocity being the radially outermost point from the axis of rotation.

Figure 3:
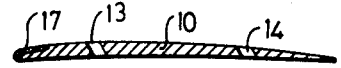
FIG. 3 is a cross-section of a turbine blade taken along the line A—A shown in FIG. 2.
Figure 4:
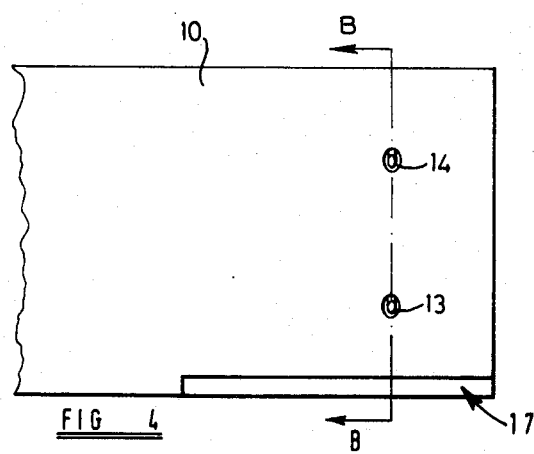
FIG. 4 shows the end region of a turbine blade with the damaged material removed ready to accept new material.
Figure 5:
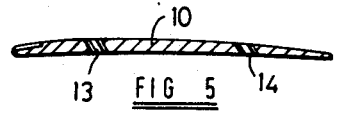
FIG. 5 is a cross-section on the line B—B shown in FIG. 4.
Figure 6:
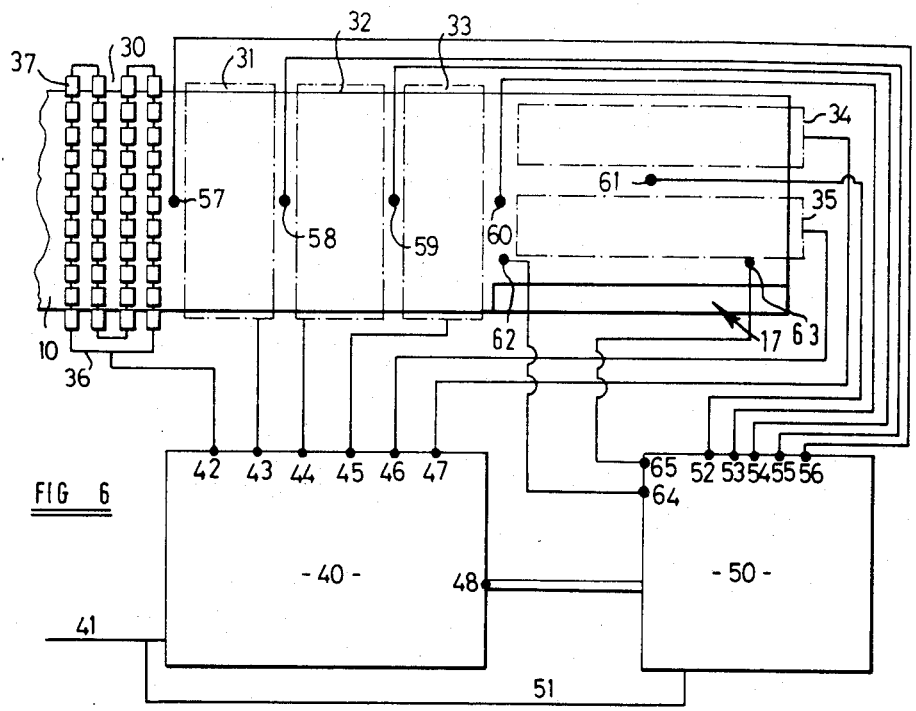
FIG. 6 illustrates the preheating of the turbine blade shown in FIGS. 4 and 5.

FIG. 3 illustrates the area where erosion is most likely to occur on the leading edge 17 of the turbine blade 10.

The steps of the repair in accordance with the present invention will now be described with reference to FIGS. 4 to 7.

Material is removed (i.e. by grinding) from the turbine blade bordering the leading edge 17 the amount of material being removed ensuring that all the damaged material is removed. It is then necessary to build up a new hard shield by a welding operation. The hard material may be Stellite.

The build up of the new shield 18 involves the application of said substantial thermal energy to the turbine blade, since the shield 18 is build up by applying molten metal to the blade 10. The temperature to which the turbine blade, at least in the area to which the new shield 18 of hard material is to be formed is far higher than any temperature to which the turbine blade may be subjected in use.

Prior to the welding operation to build up the new shield of 18 on the turbine blade 10, the area of the blade surrounding the part to be repaired is covered or surrounded with heating mats 30, 31, 32, 33, 34 and 35. The heating mats may be of any suitable form and may comprise, as shown in the heating mat 30, a continuous conductor 36 passing through throughbores in a large number of ceramic beads 37.

The temperature to which different parts of the blade are heated will depend on the material from which the blade is made, the dimensions of the blade and the type of repair to be carried out.

The blade may be heated to a temperature of about 400° C. in the repair area and different parts of the blade may be heated to different either higher or lower temperatures.

Each of the heating mats 30 to 35 are controlled by a heating control circuit 40. The control circuit 40 has an input 41 to supply the energy to all the heating elements such as the heating element 36 of the mat 30 and a plurality of outputs 42, 43, 44, 45, 46 and 47 so that the energy supplied to each of the heating mats 30 to 35 may be independently controlled. The heating control circuit 40 has an input 48 from master control unit 50. The master control unit 50 has a power supply 51 and may also be provided with inputs 52 to 56 from heat sensors 57 to 61 respectively.

Further heat sensors 62 and 63 may be connected to inputs 64 and 65 respectively of circuit 50.

The master control unit 50 can be programmed either manually or be supplied with recorded information from past analysis to control the signal supplied to input 48 of heating control circuit 40 so as to control each of the heating mats 30 to 35 with the amount of energy required to produce the desired temperature in the turbine blade 10.

Since ambient conditions may alter the actual temperature of the blade from the expected temperature given a predetermined amount of heat, sensors 57 to 61 can alter the signal produced by master unit 50 to heating control 40 so as to bring the temperature into line by altering the energisation of heating mats 30 to 35 to bring the temperature into its desired value.

After the blade has been heated for a sufficient length of time to achieve the desired temperature at different parts therealong, the building up the new shield 18 to the turbine blade 10 by welding, may take place. During this step in the repair process which imparts a said thermal heat input to the blade, the heating mats 30 to 35 may be energised or, since the heat capacity of the blade may be considerable, energisation may be terminated at this stage and the cooling process begun.

Further heat sensors 62 and 63 may be provided which provide input signals to the master control circuit 50 at inputs 64 and 65 to alter the energisation of heating mats 30 to 35 should the actual temperature of the turbine blade sensed by sensors 62 and 63 immediately adjacent the area to be repaired either be above or below an expected value due to, for example, unexpected changes in ambient condition or the length of time taken to carry out the brazing or welding operation which may increase or decrease the expected temperature.

Figure 7:
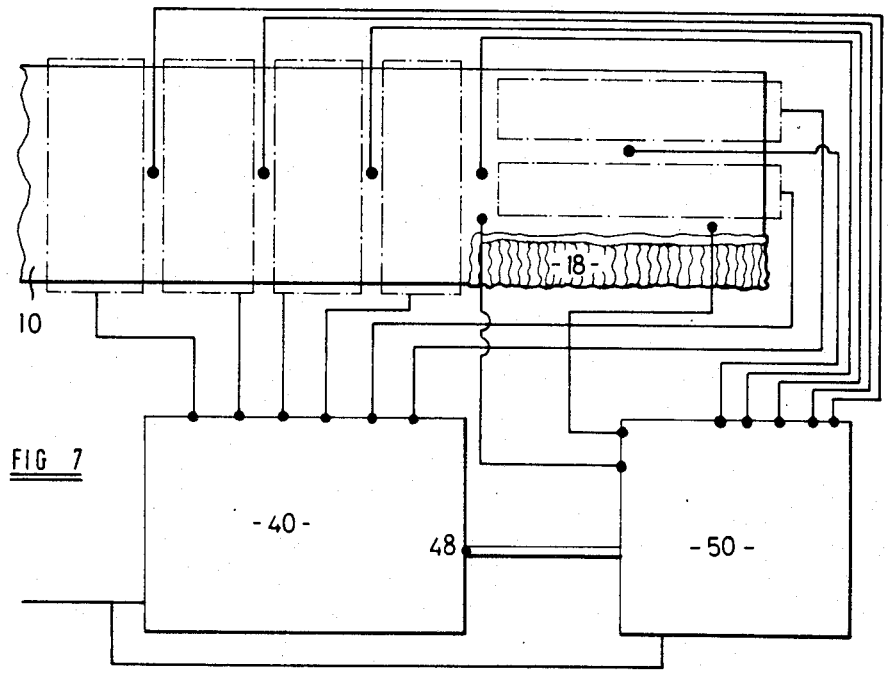
FIG. 7 illustrates the turbine blade shown in FIGS. 3 to 6 with new material welded thereon.

FIG. 7 illustrates the completed shield 18. The blade may now be subjected to further heat treatment from the heating mats 30 to 35. In some cases it may be desirable to maintain a maximum heated temperature of the blade for a certain period of time and then gradually decrease the temperature of the blade over a predetermined time period.

After the turbine blade 10 has been allowed to cool and cooled in a controlled manner to ambient temperature machining of the blade may be carried out to return it to its original form, such machining of the blade not involving the application of said thermal energy to the blade and, therefore, requiring no further controlled heating.

Figure 8:
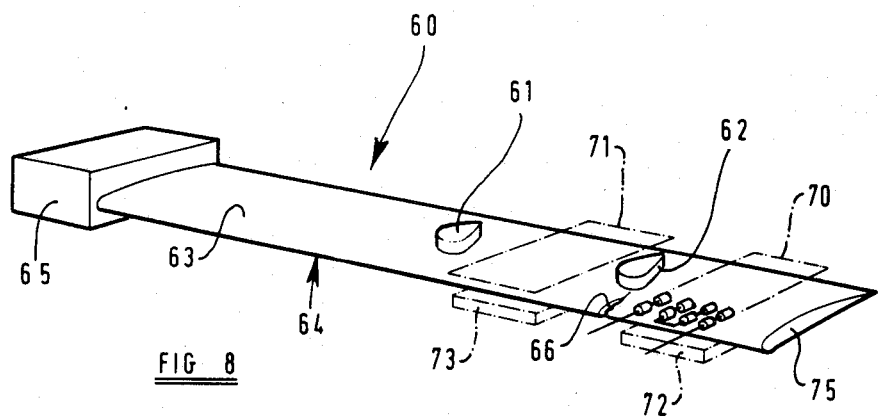
FIG. 8 illustrates a turbine blade having heating means applied thereto positioned to counter distortion of the blade.

Referring now to FIG. 8 the turbine blade 60 is illustrated a turbine blade 60 having snubbers 61 and 62 on its upperside 63, there will be provided similar snubbers on the lower side 64 of the blade by means of which the blade 60 is connected to both upper and lower adjacent blades.

The blade 60 is connected to a rotor spindle by a root 65.

The blade 60 has a crack 66 which can be repaired by removing damaged material by grinding and then filling the groove or channel so formed with metal during a welding process.

It is desirable to carry out such repairs in situ i.e. without removing the blade 60 from the rotor and it is frequently only possible to apply weld metal from one side of the turbine blade.

When it is only possible to provide new material to the blade from one side it inevitably leads to that side of the blade becoming very much hotter during the welding process than the other side of the blade and distortion of the blade will occur. The distortion is often limited by the interaction between snubbers of adjacent blades. Considerable forces are thus applied to the snubbers leading to stress within the snubbers and in the blade surrounding the snubbers.

Heating mats 70, 71, 72 and 73 are, prior to the welding operation applied to both sides of the blade in order to heat the blade to a predetermined desired temperature.

If the welding operation is to be carried out from the upper side 63 of the blade 60 then the mats 72 and 73 may be energised in a manner to heat the underside 64 of the blade to a temperature higher than that to which the upper side 63 is heated by the mats 70 and 71.

If the underside 64 of blade 60 is pre-heated to a higher temperature than the upperside 63 there will be a tendency to distort the blade the tendency being for the outer end 75 to move in an upwards direction.

When the crack 66 is repaired by welding the upper side 63 of the blade is raised to a higher temperature than the underside 64 thus distorting the blade in a direction to move the end 75 in a downwards direction. Thus the resultant distortion, due to the pre-heating of the blade, is minimised. Furthermore since the area surrounding the crack 66 is pre-heated i.e. both the upper side 63 and underside 64 the temperature gradiant along the blade is considerably decreased also assisting in minimisation of the occurrence of stress due to repair.

As has been aforedescribed with reference to FIGS. 1 to 7 the energisation of heating mats 70 to 73 may be controlled by a heating control unit 40 which itself may be controlled by a master control 50.

It is further envisaged that in order to analyse the distortion that is likely to occur to a turbine blade in a repair a blade may be repaired without any pre-heat treatment the temperature in the blade and distortion occuring being analysed for example through use of strain gauges and/or thermocouples. Further tests can then be carried out involving pre-heating of the blade in order to establish which areas of the blade should be heated and to what temperature they should be heated to minimise the occurrence of distortion and associated stress produced thereby.

Once the positions in which the heating mats should be placed and the temperature to which the blade should be heated is known the heating mats may be positioned and controlled in accordance with information received from test analysis to ensure satisfactory results.

Figure 9:
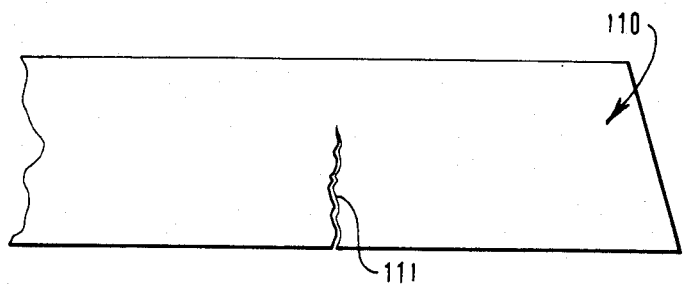
FIG. 9 is a plan view of part of a turbine blade showing a crack.

Referring to FIG. 9, a turbine blade is shown at 110 in which a crack 111 has occurred.

Figure 10:
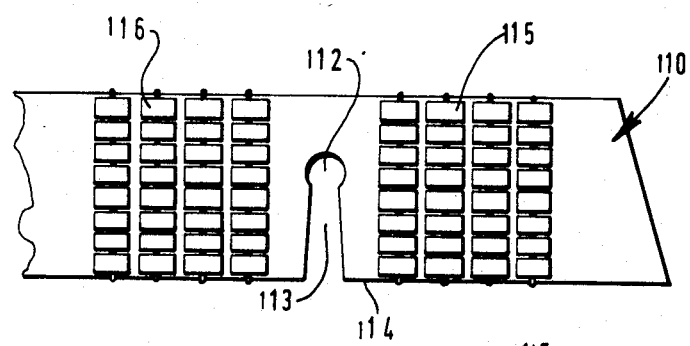
FIG. 10 is a plan view of the blade shown in FIG. 9, material around the crack having been removed.

Material from the blade 110 is removed, as shown in FIG. 10, around the inner end of the crack 111, such removal creating a wide throughbore 112, or in some cases a recess, and further material is removed to create a slot 113 extending from the throughbore 112, or recess, and having a tapered configuration such that the width of the slot 113 adjacent the edge of the blade 114 is wider than the slot adjacent the throughbore 112.

After the slot has been formed the temperature of the turbine blade 110 is raised to a first desired temperature, for example approximately 200° C. The temperature is raised by any suitable means providing variable and controlled heating such as electrical heating elements 115 and 116 which may extend completely around the blade 110 on both sides thereof, supply of current to which may be controlled by sensing signals derived from sensing means such as thermocouples in contact with the blade accurately to maintain its temperature at the desired value. The heating element 115 and control means may be similar to those described with reference to FIGS. 6 to 8.

The addition of material by a welding process is then carried out with respect to the blade, the welding commencing in the area of the throughbore 112 and being continued until the whole of the throughbore 112 and slot 113 is filled with weld material.

By commencing the welding in the area of the through bore 112 significant advantages are gained. Generally this will be the thickest part of the turbine blade requiring the most heat for satisfactory welding and, since increase in heat leads to increase in oxidation, it is advantageous as the temperature of the turbine blade increases to reduce the heat input caused by the welding operation. Thus, by starting in the area of the thickest metal, i.e. that requiring most heat input, and working towards an edge region where less heat is required, the heat input from the welding operation can gradually be reduced, thereby decreasing the presence of oxides in the weld metal.

Furthermore, by starting the welding operation in the area of the through bore 112 relative movement between the parts of the turbine blade situated either side of the stop 113 can take place, which movement being caused by input of substantial thermal energy with resultant thermal expansion without excessive residual stress being imparted to the blade.

It has been found to be advantageous to continue the welding operation until the fused metal forms a significant continuation from the edge 114 of the blade, since during such welding operation oxides and other impurities tend to flow with the weld metal towards the end of the weld. By depositing the remaining impurities after finishing the welding operation in weld metal that may subsequently be removed, any impurities remaining in the weld metal which forms part of the blade is reduced.

Figure 11:
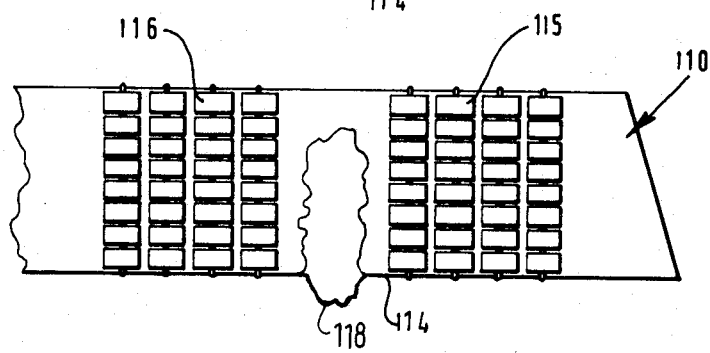
FIG. 11 illustrates the blade shown in FIGS. 9 and 10 after welding has been carried out.
Figure 12:
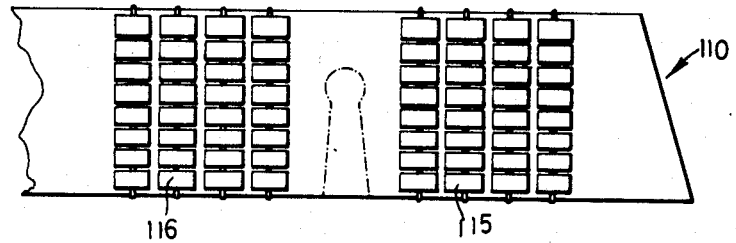
FIG. 12 is an illustration of the repaired blade.

Referring in particular to FIG. 11, it can be seen that the weld metal is continued until there is a significant protrusion 118 extending beyond the edge 114 of the blade 110. The protrusion 118 in which a significant amount of the oxides developed during the welding operation are situated may be removed by grinding for example.

During the welding process the blade 110 is maintained at said first temperature by appropriate energisation of the electrical heating elements 115 and 116.

To complete the repair excess weld material is removed, by machining for example, and the temperature of the blade is subsequently raised to a second temperature, for example 700° C. to 800° C. for a predetermined length of time to relieve the blade of any residual stress due to the high temperatures involved in the welding process.

After gradual cooling of the blade to an ambient temperature the heating elements 115 and 116 may be removed.

The material used for the welding process may be any suitable material compatible with the material from which the blade is made, which may be for example of 12% chrome steel. Alternatively the welding material may comprise an alloy capable of bonding satisfatorily to the parent metal of the blade but which welding material is inherently more resilient than that of the blade. Such a welding material enables some movement of the blade material to take place without excessive stress being built up in the blade since the more resilient material of the weld is capable of at least partly absorbing such movement.

The provision of the tapered slot 113 also assists in minimising stress in the blade since it permits relative movement between the two parts of the blade either side of the slot during the welding process, which movement will occur during solidification of the fused material of the weld tending to close that part of the slot 113 where welding material has not yet been applied.

The provision of electrical heating elements 115 and 116 considerably assists the welding process since, in combination with the thermal sensing means, for example thermocouples, very accurate control of the temperature of the blade both before, during and after the welding process can be maintained, which temperatures are critical both for the minimisation of build up of stress in a blade during a weld process and subsequent stress relief after the welding process.

A suitable resilient welding material which may be used to effect a repair is a metal sold under the Trade Mark INCONEL filler metal 82 which comprises approximately two thirds nickel, one third chrome, plus various other metallic elements in small quantities. Such a metal has been found to be very suitable for use as the weld metal in carrying out the method of the present invention.

Figure 13:
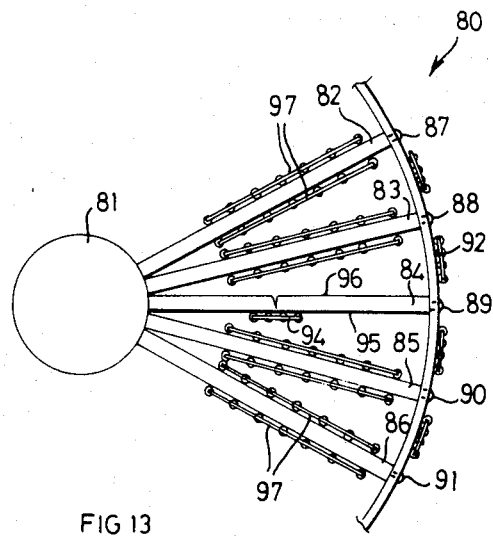
FIG. 13 illustrates part of a rotor to which the turbine blades are connected by a shroud.
Figure 14:
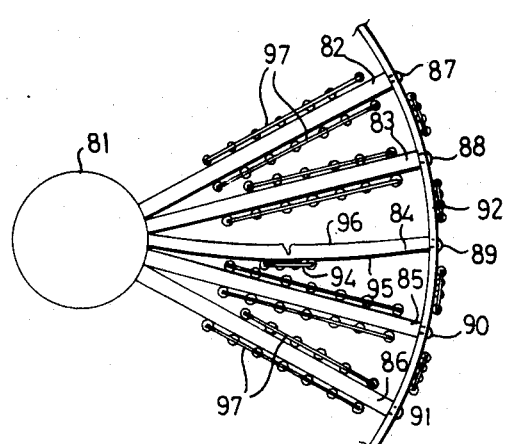
FIG. 14 illustrates the array of blades shown in FIG. 12, the blade to be repaired having been distorted by pre-heat.
Figure 15:
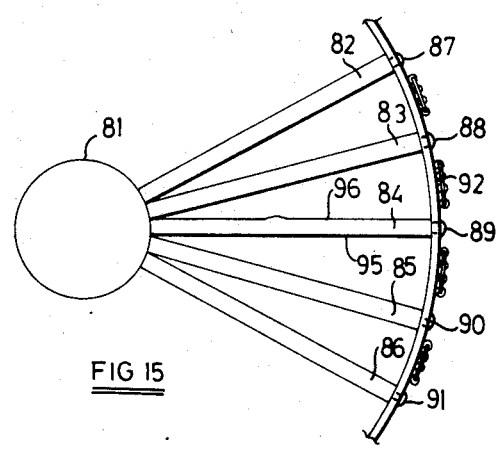
FIG. 15 illustrates the array shown in FIGS. 12 and 13 and shows the blade to be repaired after the application of considerable thermal energy.

Referring now to FIGS. 13 to 15, a method of repair is illustrated in which part of a rotor 80 is illustrated and comprises a core 81, blades 82, 83, 84, 85 and 86, which blades have respective tennons 87 to 91 by means of which they are connected to a shroud 92.

The blade 84 has a crack 93 which it is required to repair and, after removing damaged material, the blade 84 is pre-heated on the side remote from that to which the weld material is to be positioned by heating mat 94.

The heating mat 94 extends over a short length of the blade so as to minimise thermal expansion of the blade in a direction between its ends.

Thermal expansion of the blade 84 between its ends is inevitable. Thus the adjacent blades 82, 83 and 85 and 86 are also heated to a lower temperature by mats 94 in order to spread the mechanical forces acting between the shroud 92 and the tennons 87 to 91 of the blades 82 to 86 respectively so as not to concentrate a large force over one or a small number of blades.

It is envisaged that, for example the blades 82 and 86 will be heated by heating mat 97 to a lower temperature than the blades 83 and 85 which in turn will be heated to a lower temperature than the blade 84 which is the one to be required.

The shroud 92 may also be heated by a heating mat 98.

Referring now to FIG. 14, the array of blades is shown in which the blade 84 has been pre-heated and distorted as a result of greater expansion of the "underside" 95 of the blade caused by the positioning of heating mat 94. The illustration exaggerates the distortion which would actually occur in practice.

The reason for the pre-distortion of the blade is to compensate for the distortion that occurs when weld metal is applied from the upper side 96 of blade 84.

During the application of considerable thermal energy, for example by welding or brazing, the blade 84 will return to its original form as shown in FIG. 15.

After the repair process has been carried out, the blade 84 may be gradually reduced in temperature and if required additional heating mats may be placed thereon to control the cooling of the blade and likewise the cooling of blades 82, 83, 85 and 86 may also be controlled so that none of the blades are subjected to a sudden drop in temperature.

Whereas the Figures above illustrate the heating of two blades either side of the blade to be repaired, it is envisaged that a single blade either side of the blade to be repaired may be heated or several blades either side as appropriate.

It has been found that the method of repair of the present invention not only produces a repaired blade less likely to fail due to stress related cracking, but the heat treatment necessary after repair and/or the application in mechanical forces to return the blade to its correct form is eliminated or at least considerably reduced since the stress in the blade due to the application of said thermal energy is substantially reduced.

We claim:

1. A method of repairing a turbine blade, said method comprising the steps of:
   (a) applying heating means to selected areas of a turbine blade to be repaired;
   (b) heating said areas of the turbine blade to desired temperatures;
   (c) carrying out a repair step on said blade, said repair step involving the application of substantial thermal energy to the blade;
   (d) controlling said heating means during said repair step so as to heat said selected areas in a manner to reduce forces acting upon the blade due to the occurrence of thermal expansion in the blade resulting from application of said substantial thermal energy;
   (e) said heating means being positioned so that the heat transferred to the turbine blade tends to cause distortion of said blade in a direction substantially opposite to the distortion which is likely to be caused by the repair step involving the application of said substantial thermal energy;
   (f) controlling said heating means after said repair step so as to maintain said turbine blade at a predetermined temperature for a predetermined length of time.

2. A method of repairing a turbine blade as claimed in claim 1 wherein after said repair step involving application of substantial thermal energy, said blade is heated in a controlled manner to maintain said turbine blade at a temperature, or series of different temperatures, for a predetermined length of time so as to eliminate or substantially reduce stress present in said blade.

3. A method of repairing a turbine blade according to claim 1 wherein said heating means comprises electrically energized heating means.

4. A method of repairing a turbine blade according to claim 1 wherein the area to be repaired is surrounded during the repair step involving the application of substantial thermal energy by an inert atmosphere.

5. A method of repairing a crack in a turbine blade according to claim 1 wherein a substantial amount of material is removed from the turbine blade in the area of the crack and wherein said repair step involving the application of substantial thermal energy is commenced in a region surrounding the innermost end of said crack and finishes adjacent an edge region of said turbine blade.

6. A method of repairing a turbine blade according to claim 5 wherein the material of the fused metal is different from that of the parent material of the blade and is endowed when in its solidified state with more inherent resilience than the parent material of the blade.

7. A method of repairing a turbine blade according to claim 5 wherein the area to be repaired is surrounded during the repair step involving the application of substantial thermal energy by an inert atmosphere.

8. A method of repairing a turbine blade according to claim 1 wherein said repair step involving the application of substantial thermal energy comprises a welding or brazing operation and which operation is carried out from one side of said blade and wherein a backing member is provided on the other side of the blade, said backing member being provided with passages and a supply of inert gas whereby said inert gas is connected to said passages to enable the repair area to be surrounded by an inert atmosphere.

9. A method of repairing a turbine blade according to claim 1 wherein automatic control means are provided to control means for heating the blade in a controlled manner.

10. A method of repairing a turbine blade according to claim 1 wherein said blade is part of an array in which a plurality of blades are connected together by connecting means wherein said repair involves a repair step involving the application of substantial thermal energy to the turbine blade and wherein prior to the application of said substantial thermal energy at least a part of said turbine blade in the area of the repair is heated in a controlled manner and wherein one or more adjacent turbine blades are heated in a controlled manner.

11. A method of repairing a turbine blade according to claim 10 wherein said one or more adjacent turbine blades are heated to a temperature less than the temperature to which the blade to be repaired is heated.

12. A method of repairing a plurality of substantially similar or identical turbine blades in accordance with the method of claim 1, further including the steps of:
   (a) repairing one of said blades;
   (b) analyzing the structure of the first repaired blade;
   (c) repeating the repair steps of claim 1 and the analyzing step (b) on the same or a second blade; and
   (d) repairing the remaining blades while controlling the heating of said remaining blades to obtain the most satisfactory results obtained from said analysis of step (b).

* * * * *